(12) United States Patent
Bookbinder et al.

(10) Patent No.: US 8,020,410 B2
(45) Date of Patent: Sep. 20, 2011

(54) METHODS FOR MAKING OPTICAL FIBER PREFORMS AND MICROSTRUCTURED OPTICAL FIBERS

(75) Inventors: Dana Craig Bookbinder, Corning, NY (US); Robert Brett Desorcie, Painted Post, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 778 days.

(21) Appl. No.: 11/985,992

(22) Filed: Nov. 19, 2007

(65) Prior Publication Data

US 2009/0126407 A1 May 21, 2009

Related U.S. Application Data

(60) Provisional application No. 61/003,240, filed on Nov. 15, 2007.

(51) Int. Cl.
 *C03B 37/018* (2006.01)
(52) U.S. Cl. ............ 65/379; 65/384; 65/391; 65/393; 65/417
(58) Field of Classification Search .......... 65/379, 65/384, 391, 393, 417
 See application file for complete search history.

(56) References Cited

U.S. PATENT DOCUMENTS

| | | | |
|---|---|---|---|
| 4,217,027 A | 8/1980 | MacChesney et al. | 350/96.3 |
| 4,331,462 A * | 5/1982 | Fleming et al. | 65/391 |
| 5,693,115 A * | 12/1997 | Ito et al. | 65/384 |
| 6,862,900 B2 * | 3/2005 | de Sandro et al. | 65/397 |
| 7,526,166 B2 * | 4/2009 | Bookbinder et al. | 385/125 |
| 2002/0197039 A1 | 12/2002 | Carter et al. | 385/127 |
| 2006/0120678 A1 | 6/2006 | Manyam et al. | 385/125 |
| 2007/0104437 A1 | 5/2007 | Bookbinder et al. | 385/125 |
| 2008/0013905 A1 * | 1/2008 | Bookbinder et al. | 385/124 |
| 2008/0131066 A1 * | 6/2008 | Bickham et al. | 385/125 |

FOREIGN PATENT DOCUMENTS

GB 1 578 826 11/1980

OTHER PUBLICATIONS

Nagel et al., "*Modified Chemical Vapor Deposition*", Optical Fiber Communications, vol. 1, 1985, pp. 1-64.
Huenlich, T. et al. "Fiber-Preform Fabrication Using Plasma Technology: A Review", Journal of Optical Communications by Fachverlag Schiele & Schon, Berlin, DE, vol. 8, No. 4, Jan. 1, 1987, pp. 122-129.
Guan, N. et al. "Holey Fibers for Low Bending Loss", IEICE Transactions on Electronics, Electronics Society, Tokyo, JP, vol. E89C, No. 2, Feb. 1, 2006, pp. 191-196.

* cited by examiner

*Primary Examiner* — Queenie Dehghan
(74) *Attorney, Agent, or Firm* — Robert L. Carlson

(57) ABSTRACT

A method of making an optical fiber preform includes depositing silica glass on the inside of a tube substrate via a plasma chemical vapor deposition (PCVD) operation. The parameters of the PCVD operation are controlled such that the silica glass deposited on the interior of the tube substrate contains a non-periodic array of voids in a cladding region of the optical fiber preform. The optical fiber preform may be used to produce an optical fiber having a core and a void containing cladding. The core of the optical fiber has a first index of refraction and the cladding has a second index of refraction less than that of the core.

9 Claims, 7 Drawing Sheets

METHODS FOR MAKING OPTICAL FIBER PREFORMS AND MICROSTRUCTURED OPTICAL FIBERS

CROSS-REFERENCE TO RELATED APPLICATIONS

This application claims the benefit of, and priority to U.S. Provisional Patent Application 61/003,240, filed on Nov. 15, 2007 entitled, "Methods for Making Optical Fiber Preforms and Microstructured Optical Fibers", the content of which is relied upon and incorporated herein by reference in its entirety.

BACKGROUND OF THE INVENTION

1. Field of the Invention

The present invention relates generally to methods for making optical fiber preforms and optical fibers and, more specifically, to methods of making optical fiber preforms containing voids and microstructured optical fibers.

2. Technical Background

Optical fibers formed of glass materials have been in commercial use for more than two decades. Although such optical fibers have represented a quantum leap forward in the field of telecommunications, work on alternative optical fiber designs continues. One promising type of alternative optical fiber is the microstructured optical fiber, which includes holes, also commonly referred to as voids, running longitudinally along the fiber axis. The holes generally contain air or an inert gas, but may also contain other materials. The majority of microstructured fibers have a plurality of holes located around the core, wherein the holes extend along the entire length of the optical fiber. These cladding holes are also most typically arranged in a regular, periodic formation around the core of the optical fiber. In other words, if cross sections of the optical fiber are taken along the length of the optical fiber, the same individual holes can be found in essentially the same periodic hole structure relative to one another.

Microstructured optical fibers have previously been manufactured by the so-called "stack-and-draw" method, wherein an array of silica rods and/or tubes are stacked in a close-packed arrangement to form a preform that can be drawn into fiber using a conventional tower setup. There are several disadvantages to the stack and draw method. The awkwardness of assembling hundreds of very thin canes (defined by rods or tubes), as well as the possible presence of interstitial cavities when stacking and drawing cylindrical canes, may affect dramatically the fiber attenuation by introducing soluble and particulate impurities, undesired interfaces and inducing a reshaping or deformation of the starting holes. Moreover, the relatively low productivity and high cost make this method not much suitable for industrial production.

SUMMARY OF THE INVENTION

One aspect of the present invention relates to a method of making an optical fiber preform comprising voids. The optical fiber preform may be used to manufacture microstructured optical fibers. The method may comprise flowing a carrier gas comprising silica glass precursors inside a substrate tube. A plasma may be applied to the substrate tube at a first set of plasma temperature/precursor pressure parameters P1 causing a first layer of silica glass to be deposited inside the substrate tube. A plasma may then be applied to the substrate tube at a second set of plasma temperature/precursor pressure parameters P2 causing a second layer of silica glass to be deposited inside the substrate tube. The first and second parameters P1 and P2 may be selected such that the first layer of silica glass comprises a first quantity of voids and the second layer of silica glass comprises a second quantity of voids. The respective quantities of voids in the first and second layers of silica glass may differ to an extent sufficient to yield a difference in the respective refractive indices of the first and second layers of silica glass when the optical fiber preform is drawn into an optical fiber.

Another aspect of the present invention relates to a method of making an optical fiber. The method may comprise forming an optical fiber preform by flowing a carrier gas comprising silica glass precursors inside a substrate tube. A plasma may be applied to the substrate tube at a first set of plasma temperature/precursor pressure parameters P1 causing a first layer of silica glass to be deposited inside the substrate tube. A plasma may then be applied to the substrate tube at a second set of plasma temperature/precursor pressure parameters P2 causing a second layer of silica glass to be deposited inside the substrate tube. The first and second parameters P1 and P2 may be selected such that the first layer of silica glass comprises a first quantity of voids and the second layer of silica glass comprises a second quantity of voids. The respective quantities of voids in the first and second layers of silica glass may differ to an extent sufficient to yield a difference in the respective refractive indices of the first and second layers of silica glass when the optical fiber preform is drawn into an optical fiber. The optical fiber preform may then be used to produce an optical fiber comprising a core with a first refractive index and a cladding with a second refractive index less than that of the core. At least a portion of the cladding may be formed from regions of the preform containing voids such that at least a portion of the cladding contains voids.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present embodiments of the invention, and are intended to provide an overview or framework for understanding the nature and character of the invention as it is claimed.

BRIEF DESCRIPTION OF THE DRAWINGS

The following description of the specific illustrative embodiments of the present invention may be understood when read in conjunction with the following drawings in which.

DETAILED DESCRIPTION OF THE ILLUSTRATIVE EMBODIMENTS

The methods of the present invention utilize plasma chemical vapor deposition (PCVD) techniques to form optical fiber preforms having a non-periodic distribution of voids. The resultant preform is used to produce a microstructured optical fiber. At least a portion of the microstructured optical fiber is formed from a region of the optical fiber preform comprising voids such that at least a portion of the microstructured optical fiber has a non-periodic distribution of voids extending axially along the microstructured optical fiber.

Figure 1:
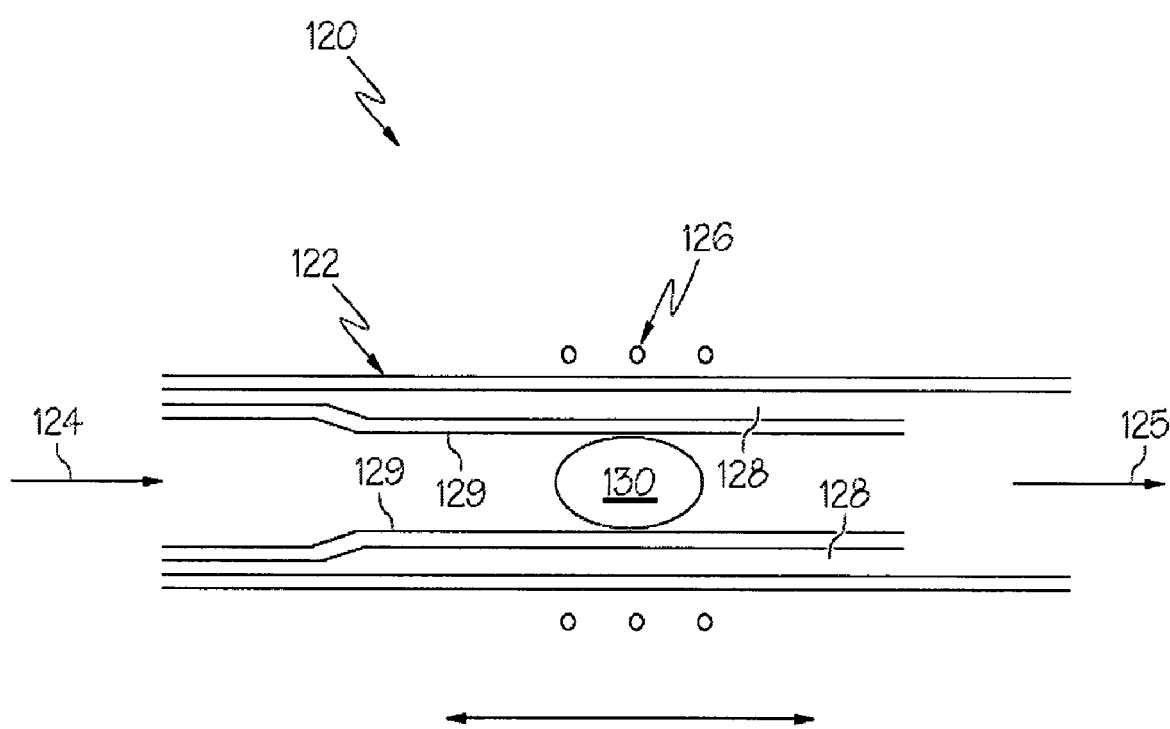
FIG. 1 shows a PCVD method for forming an optical fiber preform in accordance with an exemplary embodiment of the present invention.

FIG. 1 is a schematic diagram of a PCVD operation 120 for making an optical fiber preform in accordance with the present invention. As shown in FIG. 1, a substrate tube 122 is positioned in an RF coil 126 or another suitable plasma excitation source. A heat source (not shown), such as a furnace, may be used in conjunction with the RF coil to initially heat the substrate tube 122. The substrate tube 122 may comprise silica glass or silica glass comprising a dopant for adjusting the index of refraction of the silica glass. The dopant may comprise germania, phosphorous, aluminum, ytterbium, erbium, fluorine, or other conventional dopant materials as are known in the art or subsequently developed. The substrate tube 122 may be rotated in the RF coil 126 as the RF coil traverses the length of the substrate tube 122.

In general, silica glass may be deposited inside the substrate tube 122 by introducing a flow of carrier gas 124 comprising silica glass precursors into the substrate tube 122 while a plasma 130 is applied to the tube 122. The plasma 130 causes the silica glass precursors to react and oxidize thereby depositing silica glass 128, 129 inside the substrate tube 122. The reaction of the silica glass precursors inside the substrate tube 122 is dependent on the temperature and pressure inside the substrate tube 122 such that variations in the temperature and/or the pressure may change the characteristics of the silica glass 128, 129 deposited in the tube 122.

For example, a common silica glass precursor material is $SiCl_4$ gas. $SiCl_4$ gas may be mixed with oxygen and a flow of the gaseous mixture introduced into the substrate tube 122. When a plasma 130 is applied to the substrate tube 122, the $SiCl_4$ and oxygen react to form SiO vapors according to the following reaction:

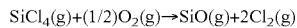

$$SiCl_4(g)+(1/2)O_2(g) \rightarrow SiO(g)+2Cl_2(g)$$

At higher temperatures and lower pressures, the SiO vapors migrate to the interior surface of the tube 122 where they undergo a heterogeneous reaction to form $SiO_2$ (silica) glass directly on the interior surface of the tube 122. The silica glass is deposited on the interior surface of the tube 122 as a result of the following reaction:

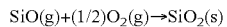

$$SiO(g)+(1/2)O_2(g) \rightarrow SiO_2(s)$$

The silica glass directly deposited on the interior surface of the substrate tube 122 via the heterogeneous reaction is dense, substantially void-free glass. Substantially void-free, as used herein, means that the deposited glass contains an insignificant or incidental amount of air or other gaseous containing voids such that the index of refraction of the deposited glass is not altered by the presence of the incidental voids.

In contrast, at higher pressures and/or lower temperatures, some, or even all, of the SiO vapors may condense and form $SiO_2$ (silica) glass particles suspended in the gaseous mixture 124 flowing through the substrate tube 122. The suspended particles are commonly referred to as silica glass soot or soot. As the gaseous mixture flows through the substrate tube 122, the soot may be deposited on the interior surface of the tube 122. Because the soot is essentially comprised of discrete silica glass particles, layers of deposited soot on the interior surface of the tube 122 may comprise pores or voids between the discrete particles of silica glass.

Figure 2:
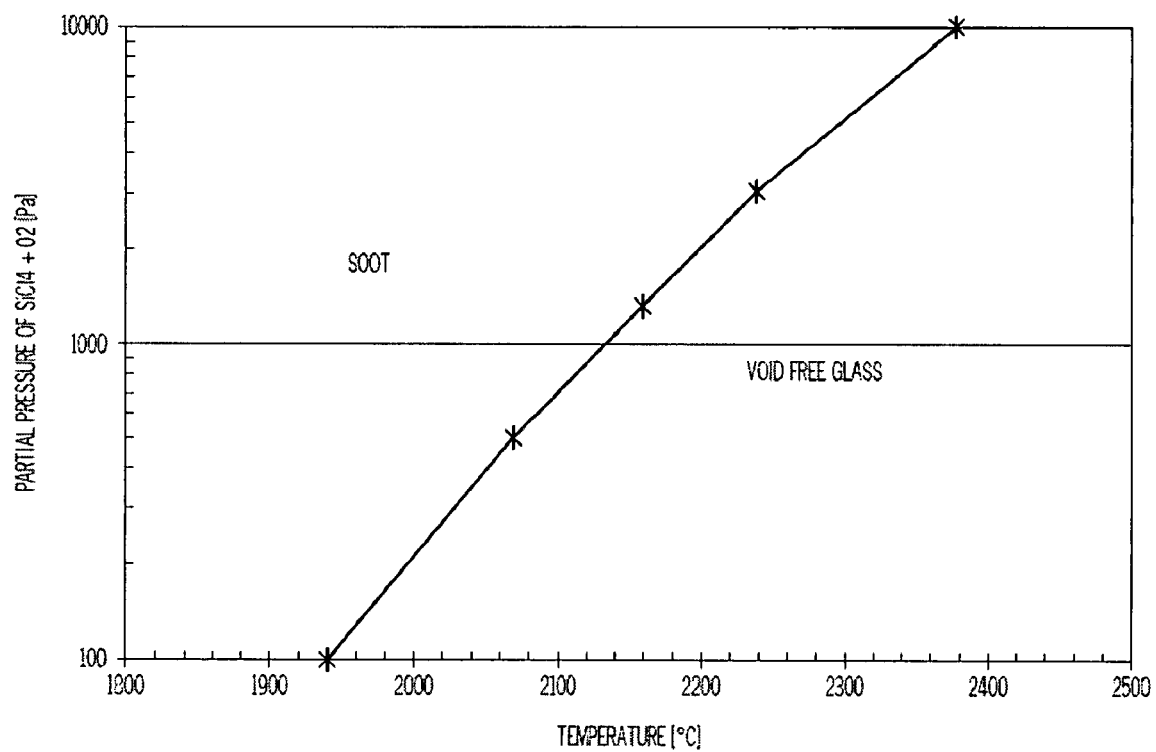
FIG. 2 graphically illustrates the relationship between the partial pressure of silica glass precursors and temperature such that either soot or substantially void free glass may be deposited during a PCVD operation.

For a PCVD operation as shown in FIG. 1 the type of silica glass (either silica glass soot which comprises voids therein or glass which is comprised of substantially void-free silica glass) deposited inside the substrate tube 122 may be controlled by selecting the appropriate process parameters, specifically the temperature of the plasma 130 applied to the substrate tube 122 and/or the partial pressure of the silica glass precursors in the gaseous flow introduced into the substrate tube 122. Referring now to FIG. 2, the relationship between the temperature inside the substrate tube and the partial pressure of silica glass precursors plus oxygen (plotted on a log scale), as it relates to the deposition of silica glass, is graphically illustrated for a particular mixture of silica glass precursors in a carrier gas. The curve shown in FIG. 2 has been determined by mathematically modeling the silica deposition process for a particular ratio of $SiCl_4$:oxygen and estimating the concentrations of the gaseous phase SiO and suspended solid $SiO_2$ by calculating their equilibrium concentrations for a specified temperature and pressure for the given $SiCl_4$:oxygen ratio. For the example shown in FIG. 2, the mixture comprises $SiCl_4$ in gaseous form mixed with oxygen in a 1:1 ratio. The calculations were performed using Outokumpu HSC Chemistry® for Windows software produced by Outokumpu Research of Oy, Finland. The software uses Gibbs free energy minimization techniques for calculating equilibrium concentrations. The curve represents a transition from the deposition of silica glass soot to substantially void free silica glass based on the selected process parameters. Combinations of temperature and partial pressure falling to the left of the curve result in the deposition of silica glass soot comprising voids in the substrate tube 122 while combinations of temperature and partial pressure falling to the right of the curve result in substantially void-free silica glass being deposited inside the substrate tube 122. It will be understood that the term "curve" as used herein with respect to the deposition process parameters, shall mean the relationship between the temperature inside the substrate tube and the partial pressure of silica glass precursors and oxygen in the carrier gas as graphically represented irrespective of whether the graphical representation is an actual curve.

As shown in FIG. 2, for a given partial pressure of $SiCl_4$ and oxygen inside the substrate tube 122, the temperature of the substrate tube 122 may be selected such that either silica glass soot is deposited inside the substrate tube 122 or substantially void-free silica glass is deposited inside the substrate tube 122. For the PCVD operation depicted in FIG. 1, the temperature inside the substrate tube 122 may be controlled by adjusting the peak temperature of the plasma 130 applied to the substrate tube 122, which, in turn, may be controlled by adjusting the power to the RF coil 126 or other plasma excitation source used to generate the plasma 130. The maximum temperature for which silica glass soot may be deposited inside the substrate tube 122 may be defined in terms of the partial pressure of the $SiCl_4$ and oxygen mixture. To deposit silica glass soot inside the substrate tube 122, the temperature inside the substrate tube 122 is preferably less than about $$102.1 \ln [\text{partial pressure}(SiCl_4+O_2)]+1507,$$

more preferably less than about $$96.9 \ln [\text{partial pressure}(SiCl_4+O_2)]+1494,$$

and most preferably less than about $$94.9 \ln [\text{partial pressure}(SiCl_4+O_2)]+1490.$$

In one embodiment, when the partial pressure of $SiCl_4+O_2$/total pressure is about 0.1, and the stoichiometric ratio of $SiCl_4+O_2$ is about 1:4, for temperatures inside the substrate tube 122 which are less than about $102.1 \ln [\text{partial pressure}(SiCl_4+O_2)]+1507$, glass comprised of soot will be deposited within the substrate tube. Conversely, under the same conditions, for temperatures inside the substrate tube 122 which are greater than about $102.1 \ln [\text{partial pressure}(SiCl_4+O_2)]+1507$, void free glass will be deposited within the substrate tube.

In another embodiment, when the partial pressure of $SiCl_4+O_2$/total pressure is about 1.0, and the stoichiometric ratio of $SiCl_4+O_2$ is about 1:4, for temperatures inside the substrate tube 122 which are less than about $96.9 \ln [\text{partial pressure}(SiCl_4+O_2)]+1494$, glass comprised of soot will be deposited within the substrate tube. Conversely, under the same conditions, for temperatures inside the substrate tube 122 which are greater than about $96.9 \ln [\text{partial pressure}(SiCl_4+O_2)]+1494$, void free glass will be deposited within the substrate tube.

In one embodiment, when the partial pressure of $SiCl_4+O_2$/total pressure is about 1.0, and the stoichiometric ratio of $SiCl_4+O_2$ is about 1:1, for temperatures inside the substrate tube 122 which are less than about $96.9 \ln [\text{partial pressure}(SiCl_4+O_2)]+1494$, glass comprised of soot will be deposited within the substrate tube. Conversely, under the same conditions, for temperatures inside the substrate tube 122 which are greater than about $96.9 \ln [\text{partial pressure}(SiCl_4+O_2)]+1494$, void free glass will be deposited within the substrate tube.

Still referring to FIG. 2, if the temperature of the substrate tube 122 is maintained at a constant level, the partial pressure of $SiCl_4$ and oxygen inside the substrate tube 122 may be selected such that either silica glass soot comprising voids is deposited inside the substrate tube 122 or substantially void-free silica glass is deposited inside the substrate tube 122. For the PCVD operation depicted in FIG. 1, the partial pressure of the $SiCl_4$ and oxygen inside the substrate tube 122 may be increased or decreased by adjusting the flow rate of the gaseous mixture through the substrate tube 122 or by using other techniques as will be apparent to those skilled in the art.

While the transition from depositing silica glass soot inside the substrate tube 122 to depositing substantially void-free silica glass inside the substrate tube 122 (and vice-versa) may be effectuated by adjusting either the temperature of the substrate tube 122 or the partial pressure of the $SiCl_4$ and oxygen mixture inside the substrate tube 122 while holding the other parameter constant, it should now be apparent that the transition from depositing silica glass soot to depositing substantially void-free silica glass (and vice-versa) may also be effectuated by simultaneously varying both the temperature of the substrate tube 122 and the partial pressure of the $SiCl_4$ and oxygen mixture flowing inside the substrate tube 122.

Further, while the relationship illustrated in FIG. 2 is for a gaseous mixture of $SiCl_4$ and oxygen in a 1:1 ratio, it should be understood that similar curves may be constructed for different mixtures of $SiCl_4$ and oxygen. For example, an excess of oxygen may be introduced into the mixture to facilitate a more complete reaction of the $SiCl_4$ silica glass precursor. Accordingly, the ratio of $SiCl_4$ to oxygen may preferably be 1:1, more preferably 1:2 and most preferably 1:4. The addition of more oxygen to the mixture will shift the curve shown in FIG. 2 to the right while generally maintaining a similar relationship between the temperature and partial pressure. Similarly, the gaseous mixture 124 flowing in the substrate tube 122 may also contain a diluent gas such as helium, nitrogen, argon, nitrogen, xenon, or other diluent gases as may be known in the art. For example, the gaseous mixture may comprise 90% argon with the remaining 10% of the gaseous mixture comprising $SiCl_4$ and oxygen in a 1:4 ($SiCl_4$ to oxygen) ratio. As with the addition of excess oxygen, the addition of a diluent gas has the effect of shifting the curve shown in FIG. 2 to the right while generally maintaining a similar relationship between the temperature and partial pressure.

Moreover, while the relationship illustrated in FIG. 2 is for a gaseous mixture of $SiCl_4$ and oxygen, it should be understood that similar curves may be constructed for other mixtures of silica glass precursor gases and carrier gases (including diluent gases) such that the process parameters for depositing silica glass soot and/or substantially void-free silica glass via a PCVD operation may be determined for the particular mixture of gases. For example, the silica glass precursor may comprise $SiCl_4$, $SiF_4$, $SiHCl_3$, $SiH_2Cl_2$, octamethyltetracyclosiloxane (OMTCS), hexamethyldisiloxane (HMDZ) or combinations thereof, preferably in gaseous form, and the carrier gas may comprise $O_2$, Ar, $N_2$, Kr, Xe, $CO_2$, $Cl_2$ or combinations thereof.

It should be understood that the cladding region of the optical fiber preform made in accordance with the method of the present invention may include the substrate tube and the layers of silica glass 128, 129 deposited therein. Depending on the process parameters temperature of the plasma 130 and the partial pressure of the silica glass precursors and oxygen in the carrier gas 124 selected, the silica glass 128, 129 deposited inside the substrate tube 122 may be silica glass soot comprising voids or substantially void-free silica glass.

As discussed herein with respect to FIG. 2, the plasma temperature and the partial pressure of the silica glass precursors and oxygen may be adjusted relative to one another such that the silica glass deposited in the substrate tube is either silica glass soot comprising voids or substantially void-free silica glass. Referring to FIG. 2, for a given plasma temperature there is range of partial pressures of the silica glass precursor and oxygen in the carrier gas 124 such that the silica glass 128, 129 deposited in the substrate tube 122 will be substantially void-free. Similarly, for a given partial pressure of silica glass precursors and oxygen in the carrier gas 124, there is a corresponding plasma temperature or range of plasma temperatures for which substantially void-free silica glass will be deposited in the substrate tube 122. However, if the partial pressure of the silica glass precursors and oxygen is increased outside of the void-free range while the plasma temperature remains constant or is decreased, the deposited silica glass 128, 129 may be silica glass soot comprising voids. Similarly, decreasing the plasma temperature outside of the void-free range while holding constant or increasing the partial pressure of silica glass precursors and oxygen may also result in the deposition of silica glass soot comprising voids. Accordingly, the process parameters of the PCVD operation 120, specifically the plasma temperature and the partial pressure of the silica glass precursor and oxygen, may be selected and varied relative to one another so as to control the formation of voids or lack thereof in the deposited silica glass 128, 129.

In one exemplary embodiment, a first set of plasma temperature/precursor pressure parameters P1 are selected to deposit a first layer of silica glass 128 in the substrate tube 122. The parameters P1 are selected such that the first layer of silica glass 128 has a first quantity of voids and a first refractive index. It should be understood that the first layer of deposited glass may be substantially void-free, as defined herein, or may contain voids, depending on the parameters P1 selected. It should be understood that the term plasma temperature, as used herein, refers to the peak temperature of the plasma 130 when the plasma is applied to the substrate tube 122 and that the term precursor pressure, as used herein, refers to the partial pressure of silica glass precursors and oxygen, collectively, in the carrier gas 124 flowing through the substrate tube 122.

A flow of carrier gas 124 comprising silica glass precursors is introduced into the substrate tube 122 using the selected process parameters. The carrier gas 122 may comprise $O_2$, Ar, $N_2$, Kr, Xe, $CO_2$, $Cl_2$ or combinations thereof. The silica glass precursors may comprise $SiCl_4$, $SiF_4$, $SiHCl_3$, $SiH_2Cl_2$, octamethyltetracyclosiloxane (OMTCS), hexamethyldisiloxane (HMDZ) or combinations thereof, preferably in gaseous form. It should be understood that the silica glass precursors utilized in the present invention are not limited to those silica glass precursors listed herein and may include any silica glass precursors as may be known in the art or subsequently developed.

A plasma 130 is applied to the substrate tube using the selected parameters to deposit a layer of silica glass 128 on the inside of the substrate tube 122. To generate the plasma 130, power is applied to the RF coil 124 to create a microwave plasma 130 inside the tube substrate 122. Depending on the selected parameters, the deposited silica glass 128 may be silica glass soot comprising voids or substantially void-free silica glass. Gaseous bi-products 125 of the PCVD operation are expelled from the substrate tube 122 on the opposite end of the tube.

If the formation of the cladding region of the optical fiber preform is complete, the core region of the optical fiber preform may be formed. If the formation of the cladding region of the optical fiber preform is not complete, the process steps described above are repeated and additional layers of silica glass 129 may be deposited inside the substrate tube 122 to form the remainder of the cladding region of the optical fiber preform.

In one embodiment, when the formation of the cladding region of the optical fiber preform is not complete, a second set of plasma temperature/precursor pressure parameters P2 may be selected so as to deposit a second or subsequent layer of silica glass 129 inside the substrate tube 122. The parameters P2 may be selected such that the second layer of silica glass has a second quantity of voids and a second refractive index. It should be understood that the second layer of deposited glass 129 may be substantially void-free, as defined herein, or may contain voids. Either the plasma temperature, precursor pressure, or both, of the second set of parameters P2 may be different than the plasma temperature and precursor pressure of the first set of parameters P1 such that the first and second deposited layers of silica glass 128, 129 have different amounts of voids and different refractive indices.

In another embodiment, when the formation of the cladding region of the optical fiber preform is not complete, as determined in step 108, a second set of process parameters P2 may be selected to form a second or subsequent layer of silica glass 129 inside the substrate tube 122. In this embodiment either the plasma temperature or partial pressure of silica glass precursors and oxygen in the carrier gas 124 may be held constant while the other process parameter is increased or decreased such that the quantity of voids in the second or subsequent layer of silica glass 129 is different than the quantity of voids in the first deposited layer of silica glass 128. When the quantity of voids in the second or subsequent layer of deposited silica glass 129 is greater than the quantity of voids in the first layer of deposited silica glass 128, the index of refraction of the second layer of silica glass 129 is less than the index of refraction of the first layer of silica glass 128. Conversely, when the quantity of voids in the second or subsequent layer of deposited silica glass 129 is less than the quantity of voids in the first layer of deposited silica glass 128, the index of refraction of the second layer of silica glass 129 is greater than the index of refraction of the first layer of silica glass 128.

In another embodiment, when the formation of the cladding region is not complete, as determined in step 108, a second set of process parameters P2 are selected such that the precursor pressure remains constant and the peak temperature of the plasma 130 applied to the substrate tube 122 is adjusted such that the plasma temperature of the second set of process parameters P2 is different than the plasma temperature of the first set of process parameters P1. The difference in plasma temperature between the first set of process parameters P1 and the second set of process parameters P2 (e.g., that used to form a layer containing voids and a layer containing void-free glass) is preferably greater than about 20° C., more preferably greater than about 50° C., and most preferably greater than about 100° C. When transitioning from depositing silica glass soot comprising voids to substantially void-free silica glass the plasma temperature of the second set of process parameters P2 will be greater than the plasma temperature of the first set of process parameters P1. When transitioning from depositing substantially void-free silica glass to silica glass soot comprising voids, the plasma temperature of the second set of process parameters P2 may be less than the plasma temperature of the first set of process parameters P1.

When the cladding region of the optical fiber preform is not complete, the depositing steps may be repeated multiple times to deposit multiple layers of silica glass inside the substrate tube 122 thereby forming the cladding region of the optical fiber preform. In one embodiment, steps 102 through 106 may be repeated multiple times to deposit consecutive layers of silica glass soot comprising voids inside the substrate tube. During each repetition a single layer of silica glass soot comprising voids may be deposited inside the substrate tube such that consecutive layers of silica glass soot comprising voids are formed inside the tube with each repetition of the steps. The steps of depositing silica glass soot comprising voids may be repeated to deposit less than 20, more preferably less than 10 and most preferably less than 5 consecutive layers of silica glass soot comprising voids inside the substrate tube.

In another embodiment, after multiple consecutive layers of silica glass based soot comprising voids have been deposited inside the substrate tube, a different set of depositing parameters P2 can be utilized such that a single layer or multiple layers of substantially void-free silica glass are deposited over the consecutive layers of silica glass soot comprising voids thereby entrapping the voids in the silica glass. The depositing steps can be repeated such that less than 10 layers, more preferably less than 5 layers, and most preferably 3 or fewer consecutive layers of substantially void-free silica glass are deposited over the consecutive layers of silica glass soot comprising voids. The process of alternating between depositing multiple consecutive layers of silica glass soot comprising voids and depositing multiple consecutive layers of substantially void-free silica glass may be repeated until the core region of the optical fiber preform is formed.

In another embodiment, the process parameters may be adjusted between each repetition such that alternating layers of substantially void-free silica glass and silica glass soot comprising voids are deposited inside the substrate tube 122.

In some embodiments, after the cladding region is formed, a core region of the optical fiber preform is formed. In one exemplary embodiment of the present invention a core region of the optical fiber preform may be formed in the substrate tube by depositing substantially void-free silica glass on the interior of the substrate tube. To form the core region of the optical fiber preform the process parameters of the PCVD operation 120 are adjusted, as described herein, such that substantially void-free silica glass is deposited inside the substrate tube and, more specifically, inside the void-containing cladding region of the optical fiber preform. The core region of the optical fiber preform has an index of refraction greater than the index of refraction of the cladding region.

Figure 3:
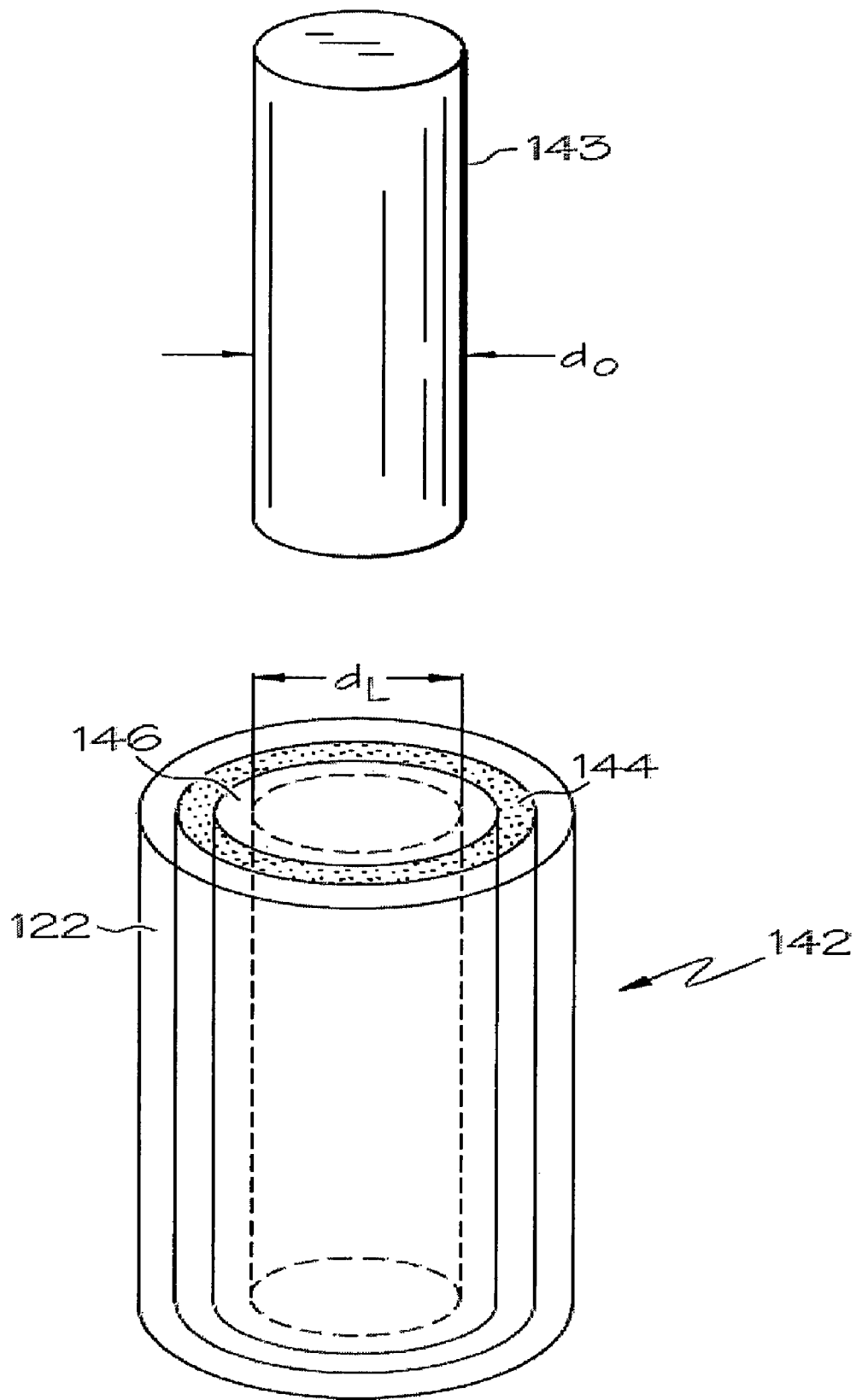
FIG. 3 shows a sleeving method for forming a core region of an optical fiber preform which may be employed with various embodiments of the present invention.
Figure 4:
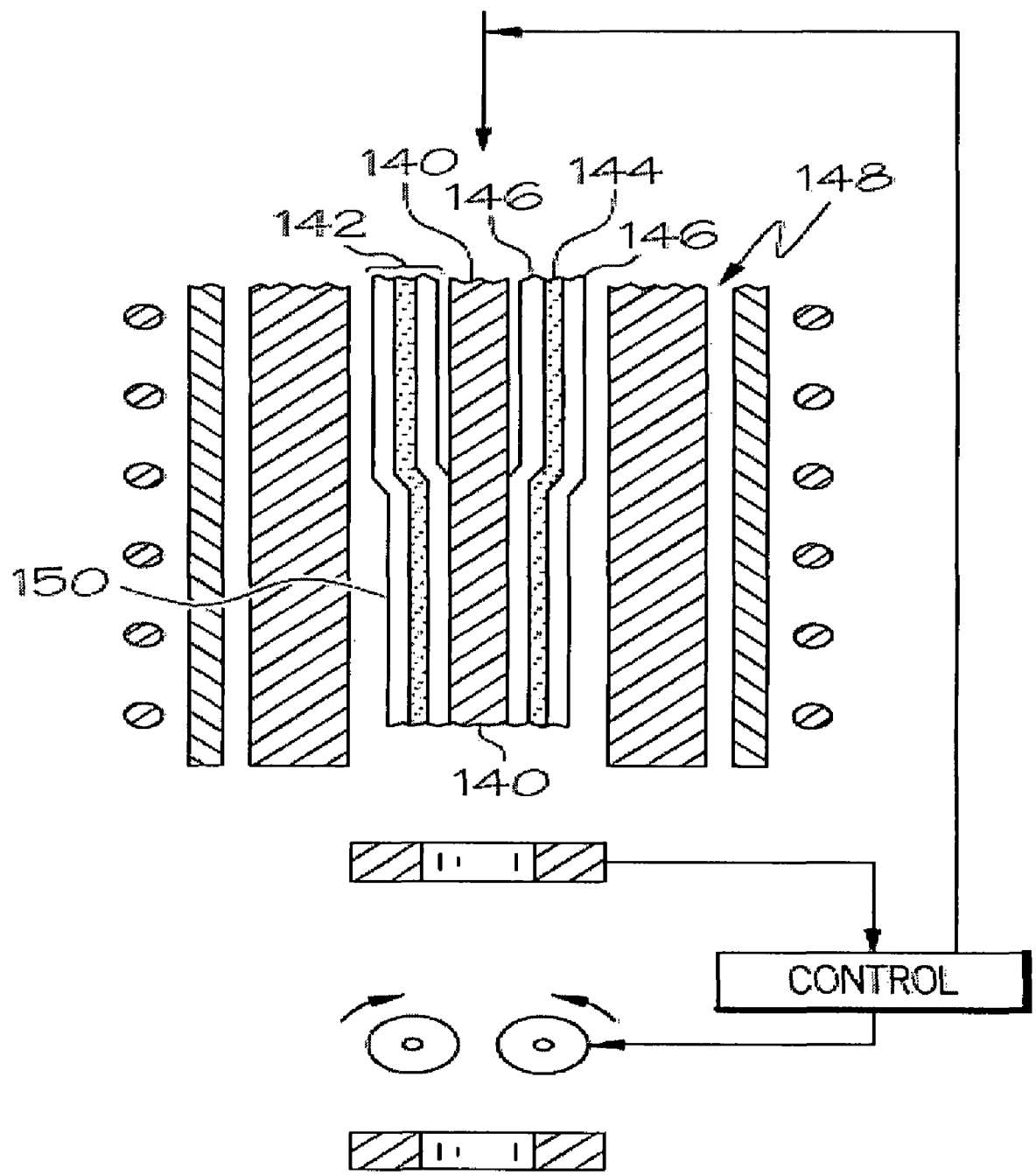
FIG. 4 shows a rod in tube manufacturing process for forming an optical fiber preform which may be employed with various embodiments of the present invention.

In another exemplary embodiment, instead of depositing substantially void-free silica glass inside the substrate tube 122 to form a core region, the substrate tube 122 and the deposited layers of silica glass 128 contained therein, together forming the cladding region 142, may be used to sleeve a void-free core cane 143 of silica glass to form a core region of the optical fiber preform. Such sleeving may be accomplished, for example, using conventional rod in tube manufacturing techniques as shown in FIGS. 3 and 4. As illustrated in FIG. 3, the sleeving process may comprise a pure (i.e., substantially free of index of refraction increasing dopants such as germanium) and void free (i.e., substantially free of index of refraction increasing voids) silica core cane 143 inserted into the cladding region 142 comprising void-free layers of silica glass 146 and void containing layers of silica glass 144. Preferably, the index of refraction of the core cane 143 is greater than the index of refraction of the cladding region 142. As shown in FIG. 4, to form the optical fiber preform 150, the silica core cane 143 and cladding region 142 are heated to a suitable temperature (e.g. greater than about 1300 to 1500° C.) in a redraw furnace 148 and then redrawn to a smaller diameter using well known rod in tube manufacturing process steps, thereby forming an optical fiber preform 150 comprising a core region 140 and a cladding region 142 from which an optical fiber can be drawn having a pure silica core surrounded by a void containing cladding in accordance with the present invention.

Figure 6:
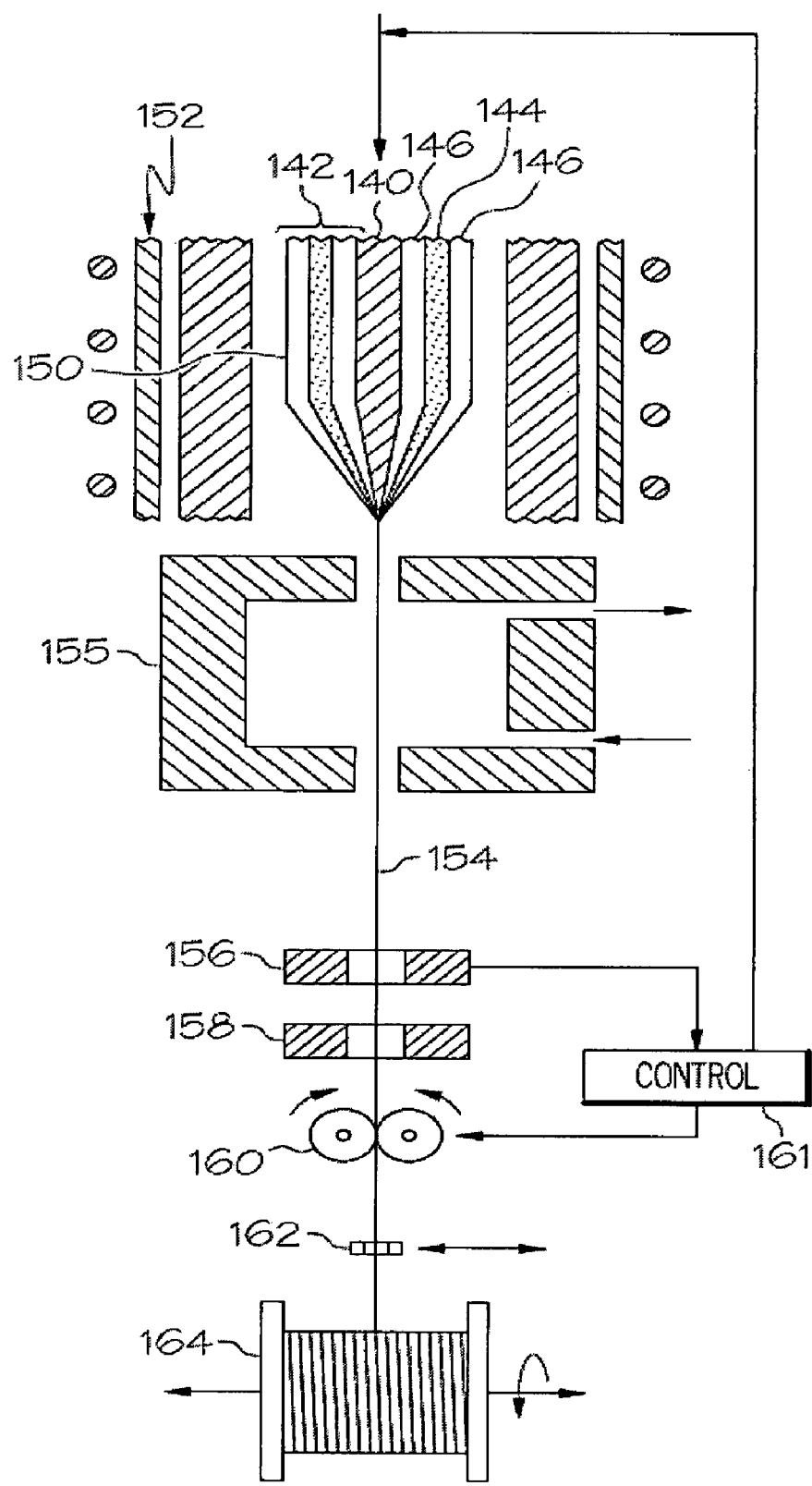
FIG. 6 shows a process and apparatus for drawing an optical fiber from an optical fiber preform that may be employed with various exemplary embodiments of the present invention.

As shown in FIG. 6 the optical fiber preform 150 made in accordance with an exemplary embodiment of the present invention may comprise a cladding region 142 and a core region 140. The core region 140 may be formed from substantially void-free silica glass. The cladding region 142 may comprise at least one layer of silica glass containing voids 144 and at least one layer of substantially void-free silica glass 146. Preferably, the layer of silica glass containing voids 144 may be spaced from the core 140 with a layer of substantially void-free silica glass 146 disposed there between. It should be understood that the structure of the cladding region 142, as described herein, is exemplary in nature and that the layers 144, 146 of the cladding region 142 may be oriented relative to the core region 140 in a variety of configurations depending on the desired optical properties of the fiber drawn from the preform 150.

It should also be understood that the silica glass contained in both the core region 140 and the cladding region 142 may also comprise dopants, such as fluorine or germanium or any other dopant material suitable for adjusting the index of refraction of the core region 140 and/or the cladding region 142. Further, the presence of dopants in the optical fiber preform 150 may be controlled during the formation of the optical fiber preform 150. For example, it may be desirable to form a specific layer of glass in the cladding region 142 such that the layer contains both voids and a dopant. During the formation of that specific layer of glass, the silica precursors in the carrier gas may be switched to, for example, $SiF_4$ such that the layer of deposited glass contains both voids and fluorine dopant. In this manner the presence and location of dopants in the optical fiber preform may be controlled.

FIG. 6 shows a conventional method and apparatus for drawing an optical fiber preform which may be used in conjunction with any one of the embodiments disclosed herein. The optical fiber preform 150 may be drawn into an optical fiber 154 by positioning the preform 150 within a draw furnace 152 as shown in FIG. 6, and then heating and drawing the optical fiber 154 as is known in the art. The fiber 154 is then cooled in a cooling chamber 155 and measured for final diameter with a non-contact sensor 156. One or more coatings may be applied and cured by a coating apparatus 158, as is also conventionally known. During the draw, the fiber 154 passes through a tension assembly 160 whereby tension is applied to draw the fiber 154 from the preform 150. The tension is controlled via a control apparatus 161 to maintain the fiber diameter at a predetermined set point. Finally, the coated fiber 154 is wound by a feedhead 162 onto a fiber storage spool 164.

Figure 5:
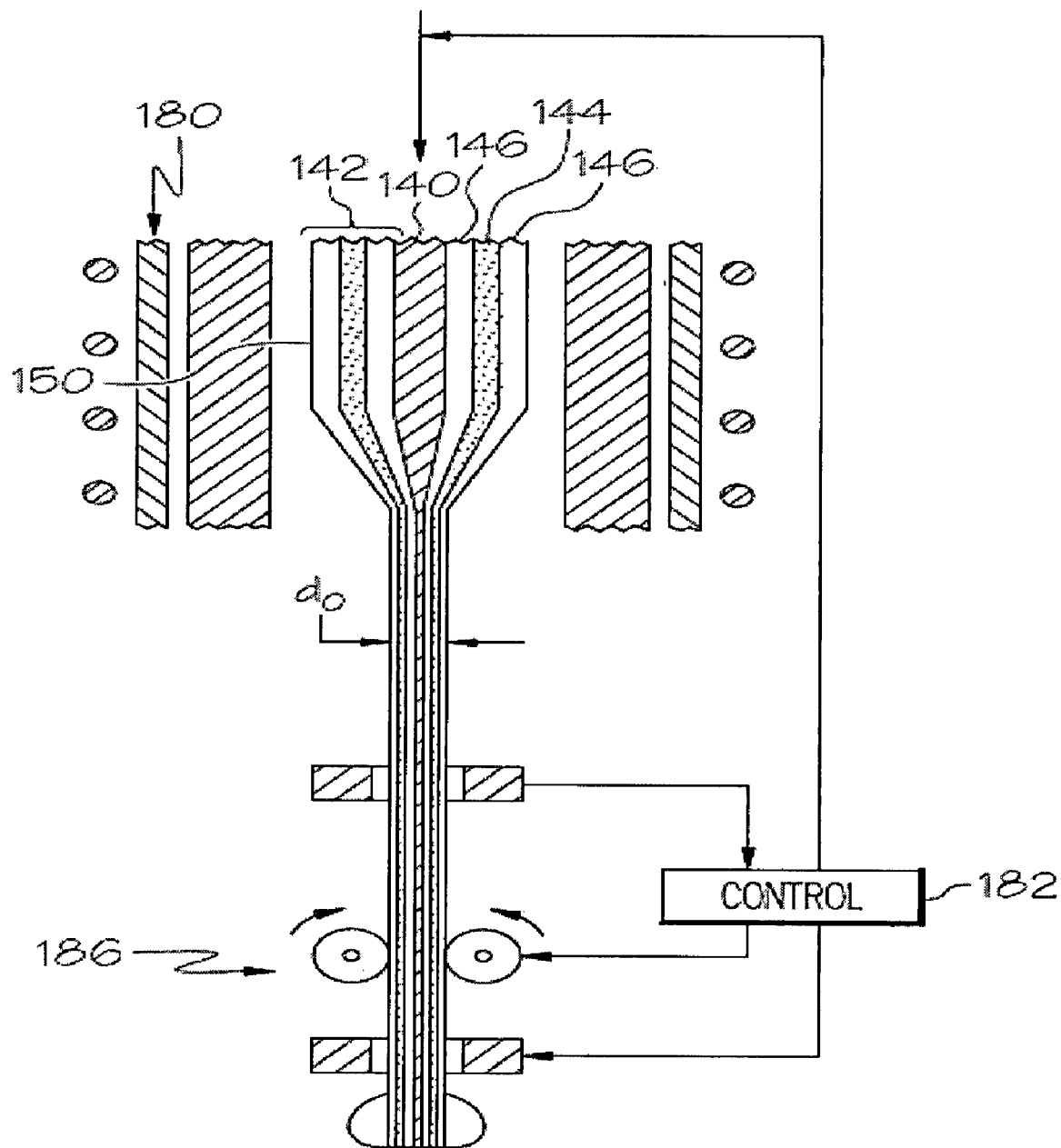
FIG. 5 shows a redraw process that may be employed with various embodiments of the present invention.

In an alternate embodiment, prior to drawing the fiber 154 from the optical fiber preform 150 as shown in FIG. 6, the optical fiber preform 150 may be redrawn in a redraw process as illustrated in FIG. 5. Such a redraw process can be used to modify the size of the voids contained in the optical fiber preform 150. For example, the greater the diameter reduction that occurs when the void containing preform 150 is redrawn, the smaller the void size will be in that preform 150.

A typical redraw process is shown in FIG. 5. In the redraw process the optical fiber preform 150 is placed in a draw furnace 180 and heated to a temperature of, for example, between about 1700° C. and 2000° C. The fiber preform 150 is then drawn to reduce the diameter of the preform 150. The controls 182 control the tension applied to the preform 150 by suitable control signals to a tension apparatus 186 to draw down the preform 150 at the proper speed. In this manner, it is possible to reduce the outer diameter of the optical fiber preform 150 while modifying the size of the voids contained in the optical fiber preform 150.

Figure 7:
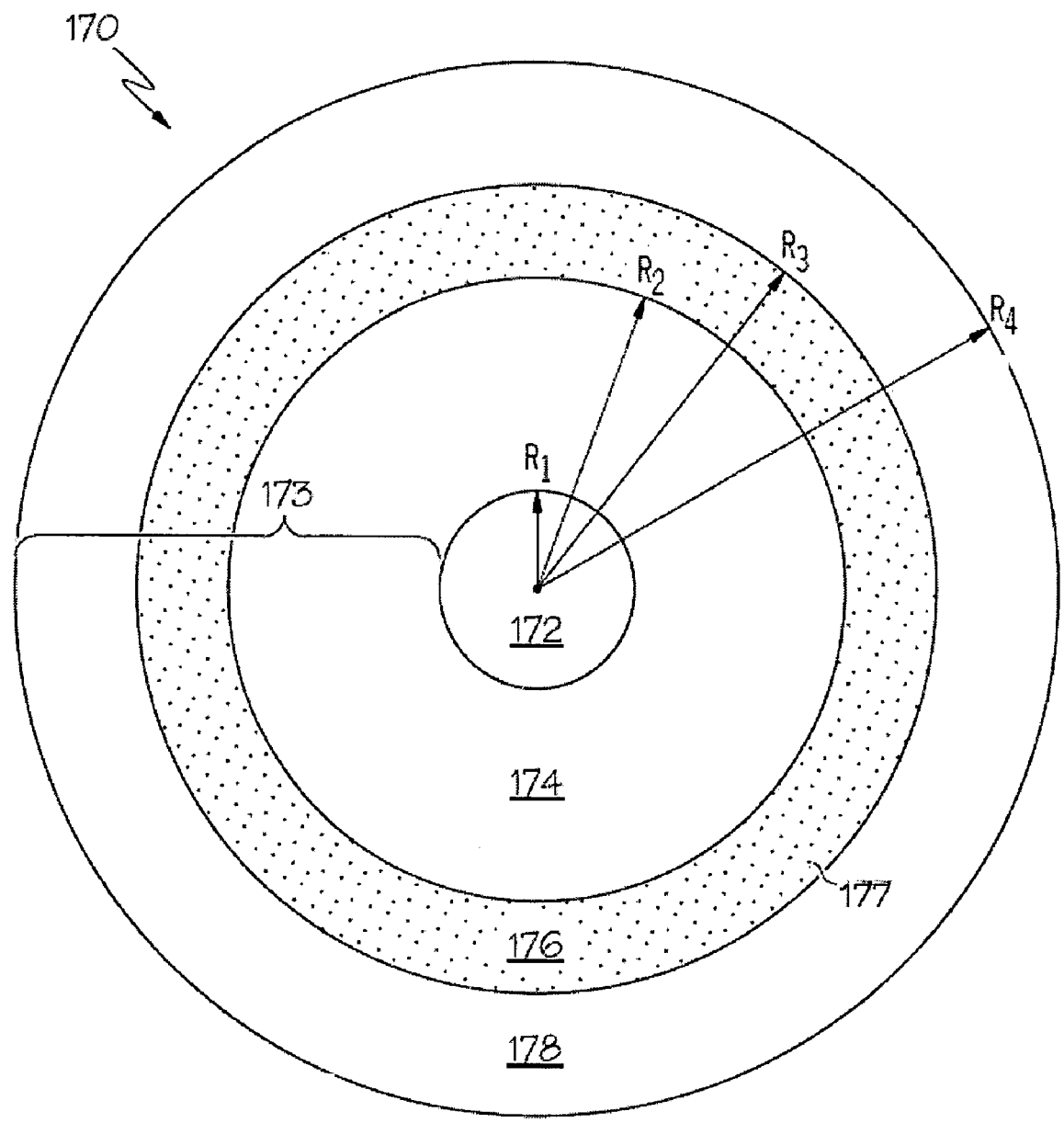
FIG. 7 shows a cross section of an optical fiber made in accordance with an exemplary embodiment of the present invention.

Referring now to FIG. 7, a cross section of an optical fiber 170 drawn from an optical fiber preform made in accordance with an exemplary embodiment of the present invention is shown. The optical fiber 170 contains a core 172 and a cladding 173. The cladding 173 may comprise an inner cladding 174 and an outer cladding 178. The core 172 is substantially void-free and has a first index of refraction. The cladding 173 has a second index of refraction and at least a portion of the cladding 173 comprises voids 177. The portion of the cladding 173 comprising voids 177 is formed from the region of the optical fiber preform comprising voids. When the optical fiber 170 is drawn from the optical fiber preform, the voids of the optical fiber preform are elongated and extend axially along the length of the fiber. Because the voids 177 extend axially along the length of the fiber 170, the voids 177 depicted in the radial cross section of the optical fiber 170 shown in FIG. 7 are illustrated in cross section and appear as holes. The index of refraction of the cladding 173 is less than the index of refraction of the core 172 due, at least in part, to the presence of the voids 177 in the cladding 173. The difference in the respective indices of refraction is such that light transmitted through the fiber 170 is retained generally within the core 172.

Still referring to FIG. 7, in an exemplary embodiment, the portion of the cladding 173 containing voids 177 may be a void containing ring 176 of silica glass spaced from the core 172 of the optical fiber 170 with a substantially void-free ring 174 of silica glass disposed between the core 172 and the void containing ring 176. For example, the void containing ring 176 of silica glass may be a relatively thin ring spaced from the core 172 of the optical fiber 170, but not extending entirely to the outer perimeter of the optical fiber 170. The radial width of the void containing ring 176 may be from about 0.5 μm to about 40 μm, more preferably from about 1 μm to about 20 μm, and most preferably from about 2 μm to about 10 μm. The void containing ring 176 of the optical fiber 170 may be spaced from the core 172 by a radial distance of about 0.5 μm to about 20 μm, more preferably from about 1 μm to about 15 μm, and most preferably from about 2 μm to about 10 μm. Spacing the void containing ring 176 from the core 172 may lower the attenuation of the optical fiber 170 at 1550 nm, a typical wavelength of light transmitted through the optical fiber. A thin void containing ring 176 also facilitates making the optical fiber 170 single moded at 1550 nm. The optical fiber 170 may include dopants, such as germania, fluorine, titanium, boron, phosphorous, aluminum or any other doping material now known or subsequently developed, to adjust the refractive index of the core 172 and/or each region of the cladding 173, but these dopants may also be avoided and, instead, the voids 177 alone may be used to adjust the index of refraction of the cladding 173 with respect to the core 172.

Still referring to FIG. 7, in one embodiment, the radial thickness of the void containing ring 176 (R3-R2) may be described in terms of the radius of the entire fiber (R4). The radial thickness of the void containing ring 176 may be from about 0.016*R4 to about 0.4*R4. For example, for a 125 μm diameter fiber (R4=62.5 μm), the radial thickness of the void containing ring 176 may be from about 1 μm to about 25 μm.

Still referring to the cross section of the optical fiber 170 shown in FIG. 7, in one embodiment, the optical fiber 170 may be 125 μm in diameter and the void containing ring 176 may be radially spaced from the core 172 (i.e. R2-R1) by about 0.5 μm to about 40 μm, most preferably from about 2 μm to about 10 μm. The radial thickness of the void containing ring 176 is from about 1 μm to about 25 μm.

The voids 177 contained in the cladding region 173 may be non-periodically distributed through the cross section of the fiber 170. Non-periodic distribution means that, for a given cross section of the optical fiber 170, the voids 177 are randomly or non-periodically distributed across at least a portion of the fiber 170. Cross sections taken at different points along the length of the fiber 170 will exhibit slightly different non-periodic distributions of voids 177, and the cross section of the voids 177 will also differ. Individual voids 177 may stretch along the length of the fiber 170, but may not extend the entire length of the fiber 170. While not wishing to be bound by theory, it is believed that individual voids 177 extend less than a few meters, and in many cases less than 1 meter along the length of the fiber 170. However, voids 177 are contained along the entire length of the fiber.

Using the PCVD techniques disclosed herein to produce an optical fiber preform containing voids, it is possible to make optical fibers with claddings that exhibit a total fiber-void area percent (i.e., total cross-sectional area of the void holes divided by total cross-sectional area of the optical fiber multiplied by 100) greater than 0.01 percent, more preferably greater than 0.05 percent, most preferably greater than about 0.5 percent. However, it is believed that, depending on fiber design, a total fiber-void area percent of less than 1, more preferably less than 0.7, and most preferably in the range from about 0.01 to about 0.5 percent, may result in a fiber with greatly improved bend performance.

In some illustrative embodiments, the total fiber-void area percent in the fiber is less than 20, more preferably less than 15, even more preferably less than 10, and most preferably less than 5 percent. Such void containing claddings can be used to lower the refractive index of the optical fiber cladding relative to the optical fiber core and thus form a cladding which guides light along the core of the optical fiber. By selecting the appropriate PCVD conditions when making the optical fiber preform and thereby controlling the formation of voids in the preform, as described above, a variety of useful optical fiber designs can be achieved. For example, by selecting the maximum void size in the optical fiber preform to be less than that of the wavelength of light which is to be transmitted (for example, less than 1550 nm for some telecommunications systems), and preferably less than one half of the wavelength of light which is to be transmitted along the fiber, low attenuation fibers can be achieved without the use of expensive dopants. Consequently, for a variety of applications, it is desirable for the voids to be formed in the preform such that at least greater than 95% of and preferably all of the voids, and therefore the voids in the optical fiber, each have a maximum cross section in the cladding of the optical fiber which is greater than about 1 nm and less than about 1550 nm, more preferably greater than about 1 nm and less than about 775 nm, most preferably greater than about 1 nm and less than about 250 nm. Likewise, it is preferable that the mean cross sectional diameter of the voids in the fiber be less than 7000 nm, more preferably less than 2000 nm, and even more preferably less than 1550 nm, and most preferably less than 775 nm, all of which mean diameters may be achievable using the methods disclosed herein. In some embodiments, the fibers disclosed herein may have greater than 10 and less than 5000 voids, in some embodiments greater than 10 and less than 1000 voids, and in some embodiments the total number of voids may be greater than 10 and less than 500 voids in a given optical fiber perpendicular cross-section. Of course, the most desired fibers may exhibit combinations of these characteristics. Thus, for example, in one illustrative embodiment of an optical fiber may exhibit less than approximately 200 voids in the optical fiber, the voids having a maximum diameter of less than 1550 nm and a mean diameter less than 775 μm, although useful and bend resistant optical fibers can be achieved using larger and greater numbers of voids.

It will be apparent to those skilled in the art that various modifications and variations may be made to the present invention without departing from the spirit and scope of the invention. Thus it is intended that the present invention cover the modifications and variations of this invention provided they come within the scope of the appended claims and their equivalents.

What is claimed is:

1. A method of making an optical fiber preform, the method comprising:
   flowing a carrier gas comprising $SiCl_4$ inside a substrate tube and applying a plasma to the substrate tube at a temperature in ° C. and precursor pressure in Pascals such that the temperature in ° C. inside the substrate tube is less than about
   102.1 ln [partial pressure($SiCl_4+O_2$)]+1507 thereby causing a layer of silica glass to be deposited inside the substrate tube, which comprises non-periodically distributed voids.

2. The method of claim 1 wherein, the temperature inside the substrate tube is less than about $$96.9 \ln [\text{partial pressure}(SiCl_4+O_2)]+1494.$$

3. The method of claim 1 wherein, the temperature inside the substrate tube, is less than about $$94.9 \ln [\text{partial pressure}(SiCl_4+O_2)]+1490.$$

4. The method of claim 1 wherein the plasma temperature is from about 1500° C. to about 2500° C.

5. The method of claim 1, further comprising depositing a silica soot layer which is at least substantially void free, and, the temperature in the substrate tube used to deposit the layer of silica glass soot comprising voids is less than the temperature used to deposit the layer of substantially void-free silica glass by at least about 20° C.

6. The method of claim 1, further comprising depositing a silica soot layer which is at least substantially void free, and, the temperature in the substrate tube used to deposit the layer of silica glass soot comprising voids is less than the temperature used to deposit the layer of substantially void-free silica glass by at least about 50° C.

7. The method of claim 1 wherein the optical fiber preform is used to produce an optical fiber of radius R comprising a core of radius R1 comprising a first index of refraction and a cladding comprising a second index of refraction less than the first index of refraction, wherein at least a portion of the cladding is formed from the region of the optical fiber preform comprising voids such that at least a portion of the cladding comprises non-periodically distributed voids.

8. The method of claim 7 wherein the portion of the cladding comprising voids is spaced from the core of the optical fiber by about 1 μm to about 25 μm.

9. The method of claim 7 wherein a cross section of the portion of the cladding comprising voids has a radial thickness of about 0.016*R to about 0.4*R.

* * * * *